US009512348B2

(12) United States Patent
Reyes et al.

(10) Patent No.: US 9,512,348 B2
(45) Date of Patent: *Dec. 6, 2016

(54) REMOVAL OF INORGANIC DEPOSITION FROM HIGH TEMPERATURE FORMATIONS WITH NON-CORROSIVE ACIDIC PH FLUIDS

(71) Applicant: Halliburton Energy Services, Inc., Houston, TX (US)

(72) Inventors: Enrique Antonio Reyes, Tomball, TX (US); Alyssa Lynn Smith, Humble, TX (US); Aaron M. Beuterbaugh, Spring, TX (US); Wirdansyah Lubis, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/852,710

(22) Filed: Mar. 28, 2013

(65) Prior Publication Data

US 2014/0296113 A1 Oct. 2, 2014

(51) Int. Cl.
*C09K 8/528* (2006.01)
*C09K 8/74* (2006.01)

(52) U.S. Cl.
CPC ........ *C09K 8/528* (2013.01); *C09K 8/74* (2013.01)

(58) Field of Classification Search
CPC .......... C09K 8/04; C09K 8/528; C09K 8/52; C09K 8/54; C09K 8/74
USPC .......................................... 507/241; 510/109
See application file for complete search history.

(56) References Cited

U.S. PATENT DOCUMENTS

| | | |
|---|---|---|
| 3,077,454 A | 2/1963 | Monroe et al. |
| 4,765,913 A | 8/1988 | Featherstone |
| 5,697,443 A | 12/1997 | Brezinski et al. |
| 5,783,524 A | 7/1998 | Greindl et al. |
| 6,093,849 A | 7/2000 | Aksela et al. |
| 6,436,880 B1 | 8/2002 | Frenier |
| 6,590,120 B1 | 7/2003 | Aksela et al. |
| 6,924,255 B2 | 8/2005 | Chang et al. |
| 7,470,330 B2 | 12/2008 | Keatch |
| 7,621,334 B2 | 11/2009 | Welton et al. |
| 7,906,464 B2 | 3/2011 | Davidson |
| 7,992,656 B2 | 8/2011 | Dusterhoft et al. |
| 8,066,846 B2 | 11/2011 | Parén et al. |
| 8,071,511 B2 | 12/2011 | Welton et al. |
| 8,361,937 B2 | 1/2013 | Cassidy et al. |
| 2002/0070022 A1* | 6/2002 | Chang et al. .............. 166/305.1 |
| 2004/0009880 A1* | 1/2004 | Fu ............................ C09K 8/68 507/200 |
| 2007/0221246 A1 | 9/2007 | Keatch |
| 2008/0035340 A1* | 2/2008 | Welton ................. C09K 8/035 166/279 |
| 2008/0277112 A1 | 11/2008 | Welton et al. |
| 2010/0089579 A1* | 4/2010 | Reyes ..................... G01N 15/00 166/280.1 |
| 2010/0276152 A1* | 11/2010 | De Wolf et al. .......... 166/308.2 |
| 2012/0097392 A1 | 4/2012 | Reyes et al. |
| 2012/0115759 A1 | 5/2012 | Reyes |
| 2012/0145401 A1 | 6/2012 | Reyes |
| 2012/0172263 A1 | 7/2012 | Reyes et al. |
| 2012/0202720 A1 | 8/2012 | de Wolf et al. |
| 2012/0238479 A1 | 9/2012 | Choudhary et al. |
| 2013/0274154 A1* | 10/2013 | Nasr-El-Din ............ C09K 8/72 507/241 |
| 2013/0281329 A1* | 10/2013 | De Wolf et al. .............. 507/241 |

FOREIGN PATENT DOCUMENTS

| | | |
|---|---|---|
| WO | 2005064074 A2 | 7/2005 |
| WO | 2007104054 A1 | 9/2007 |
| WO | 2009086954 A1 | 7/2009 |
| WO | 2009137399 A2 | 11/2009 |
| WO | 2010053904 A2 | 5/2010 |
| WO | 2010056779 A2 | 5/2010 |
| WO | 2012080297 A1 | 6/2012 |
| WO | 2012080463 A1 | 6/2012 |
| WO | WO 2012/080299 * | 6/2012 |
| WO | 2012113738 A1 | 8/2012 |
| WO | 2012116032 A1 | 8/2012 |

OTHER PUBLICATIONS

Aboud, Ricardo, et al., "Effective Matrix Acidizing in High-Temperature Environments," SPE109818, 2007, pp. 1-10, Society of Petroleum Engineers.
Bagci, Suat, "The Effect of Fractures on the Steam-Assisted Gravity Drainage Process," Energy & Fuels, 2004, pp. 1656-1664, vol. 18, No. 6, American Chemical Society.
Boethling, R. S., et al., "Designing Small Molecules for Biodegradability," Chem. Rev., 2007, pp. 2207-2227, vol. 107, No. 6, American Chemical Society.
Filing receipt and specification for patent application entitled "Wellbore Servicing Compositions and Methods of Making and Using Same," by Enrique Antonio Reyes, et al., filed Mar. 21, 2013 as U.S. Appl. No. 13/848,407.
Hancock, Robert D., et al., "Ligand Design for Selective Complexation of Metal Ions in Aqueous Solution," Chem. Rev., 1989, pp. 1875-1914, vol. 89, No. 8, American Chemical Society.
Hyvönen, Helena, "Studies on Metal Complex Formation of Environmentally Friendly Aminopolycarboxylate Chelating Agents," 2008, pp. 1-94, University of Helsinki, Finland.
Katata, L., et al., "Determination of Ethylenediaminetetraacetic Acid, Ethylenediaminedisuccinic Acid and Iminodisuccinic Acid in Cosmetic Products by Capillary Electrophoresis and High Performance Liquid Chromatography," Analytica Chimica Acta, 2006, pp. 177-184, vol. 579, Elsevier B.V.

(Continued)

*Primary Examiner* — Frances Tischler
(74) *Attorney, Agent, or Firm* — Craig W. Roddy; Baker Botts L.L.P.

(57) ABSTRACT

A method of servicing a wellbore in a subterranean formation comprising preparing a wellbore servicing fluid comprising an amino multicarboxylic acid chelating agent, a pH adjusting compound, and an aqueous base fluid, and contacting the wellbore servicing fluid with scale deposits on a surface in fluid communication with the wellbore and/or subterranean formation.

19 Claims, 1 Drawing Sheet

(56) References Cited

OTHER PUBLICATIONS

Ko•Ody Ńska, Dorota, "Iminodisuccinic Acid as a New Complexing Agent for Removal of Heavy Metal Ions from Industrial Effluents," Chemical Engineering Journal, 2009, pp. 277-288, vol. 152, Elsevier.

McClatchie, D.W., "The Removal of Hard Scales from Geothermal Wells: California Case Histories," SPE 60723, 2000, pp. 1-7, Society of Petroleum Engineers, Inc.

Metsärinne, Sirpa, et al., "Determination of Novel Complexing Agents in Pulp and Paper Mill Effluents and in Lake Water by Liquid Chromatography," Journal of Chromatography A, 2005, pp. 56-59, vol. 1094, Elsevier.

Nowack, Bernd, "Environmental Chemistry of Aminopolycarboxylate Chelating Agents," Environmental Science & Technology, 2002, pp. 4009-4016, vol. 36, No. 19, American Chemical Society.

Phillips, Sidney L., et al., "A Survey of Treatment Methods for Geothermal Fluids," SPE 6606, Society of Petroleum Engineers of AIME, 1976, pp. 187-194 plus 2 pages of Tables, American Institute of Mining, Metallurgical, and Petroleum Engineers, Inc.

Rahman, M. Azizur, et al., "Hydroxyiminodisuccinic Acid (HIDS): A Novel Biodegradable Chelating Ligand for the Increase of Iron Bioavailability and Arsenic Phytoextraction," Chemosphere, 2009, pp. 207-213, vol. 77, Elsevier Ltd.

Tandy, Susan, et al., "Extraction of Heavy Metals from Soils Using Biodegradable Chelating Agents," Environmental Science & Technology, 2004, pp. 937-944, vol. 38, No. 3, American Chemical Society.

Tsang, Daniel C. W., et al., "Kinetic Interactions of EDDS with Soils. 2. Metal—EDDS Complexes in Uncontaminated and Metal-Contaminated Soils," Environmental Science & Technology, 2009, pp. 837-842, vol. 43, No. 3, American Chemical Society.

Wajima, Takaaki, et al., "Treatment of Geothermal Water from Geothermal Plant Using Hydrotalcite for Removal of Harmful Anions," Abstract, Jun. 2009, p. 263, Proceedings of the Nineteenth International Offshore and Polar Engineering Conference, Osaka, Japan, International Society of Offshore and Polar Engineers (ISOPE).

Whitburn, Joanne S., et al. "Chemical Speciation of Ethylenediamine-N-N'-Disuccinic Acid (EDDS) and Its Metal Complexes in Solution," Chemical Speciation and Bioavailability, 1999, pp. 85-93, vol. 11, No. 3.

International Preliminary Report on Patentability issued in related PCT Application No. PCT/US2014/031583, mailed Jun. 12, 2015 (20 pages).

Foreign communication from a related counterpart application—International Search Report and Written Opinion, PCT/US2014/020288, May 14, 2014, 10 pages.

Foreign communication from a related counterpart application—International Search Report and Written Opinion, PCT/US2014/031583, May 14, 2014, 11 pages.

* cited by examiner

REMOVAL OF INORGANIC DEPOSITION FROM HIGH TEMPERATURE FORMATIONS WITH NON-CORROSIVE ACIDIC PH FLUIDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of servicing a wellbore to remove mineral scale deposits from a surface associated therewith.

During the production stage of a wellbore, fluids (e.g., gas, oil, steam, hot water, etc.) are generally produced from the wellbore, and scale can develop in the wellbore, subterranean formation and/or on equipment associated with the wellbore, such as downhole equipment (e.g., casings, production tubing, mandrels, pipes, pumps, etc.) and surface equipment (e.g., pumps, heating turbines, heat exchangers, etc.). Whenever the wellbore produces water, or when water injection is used to enhance the recovery of the natural resource, there typically is the possibility that scale will form. Scale may have an adverse effect on several aspects of a wellbore's completion and production stages, from inhibiting the performance of downhole tools to inducing formation damage and plugging of associated equipment, whether such equipment is located downhole or at the surface of the wellbore. Scale may block flow of the natural resources by clogging perforations or forming a thick lining in the production tubing. Scale can also coat and damage wellbore equipment, such as heating turbines, heat exchangers, safety valves, casings, production tubing, mandrels, pipes, separators, pumps, etc.

If the scale is not removed, the wellbore capacity production can diminish drastically, and in some cases scale deposits can cause the wellbore production to be shut down for a period of time. As such, scale deposits may be removed to allow the unimpeded flow of natural resources through the wellbore. Some scales, such as for example silica scale, can be typically removed by dissolution with harsh acids, which can have corrosive effects on the wellbore equipment and may damage the formation. Thus, an ongoing need exists for compositions that are less damaging to metallurgical surfaces and methods of removing mineral scale deposits using such compositions in a wellbore, subterranean formation and/or equipment associated with the wellbore.

SUMMARY

Disclosed herein is a method of servicing a wellbore in a subterranean formation comprising preparing a wellbore servicing fluid comprising an amino multicarboxylic acid chelating agent, a pH adjusting compound, and an aqueous base fluid, and contacting the wellbore servicing fluid with scale deposits on a surface in fluid communication with the wellbore and/or subterranean formation.

Also disclosed herein is a method of servicing a wellbore in a subterranean formation comprising preparing a wellbore servicing fluid comprising an amino multicarboxylic acid chelating agent, a pH adjusting compound, and an aqueous base fluid; wherein the chelating agent comprises methylglycine diacetic acid or glutamic acid diacetic acid, and the pH adjusting compound comprises hydrochloric acid, and contacting the wellbore servicing fluid with scale deposits on a surface in fluid communication with the wellbore and/or subterranean formation, wherein the scale deposits comprise less than about 80 wt. % silica, based on the total weight of the scale deposit.

Further disclosed herein is a scale-removing wellbore servicing fluid comprising an amino multicarboxylic acid chelating agent acid that (i) has $pK_a$ values greater than about 1, and (ii) at least two carboxylic acid groups in the anionic carboxylate form (i.e., —COO$^-$) at pH values less than about 6, a pH adjusting compound; and an aqueous base fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 displays a comparison of a scale removal treatment in the absence (A) and in the presence (B) of hydrofluoric acid.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a chelating agent, a pH adjusting compound, and an aqueous base fluid. Utilization of a WSF comprising a chelating agent in the methods disclosed herein may advantageously facilitate the removal of at least a portion of a scale deposit from a surface in fluid communication with a wellbore and/or subterranean formation. Hereinafter, the disclosure will refer to the use of WSFs for the removal of a scale deposit from a natural surface (e.g., geological surface) or artificially placed or deliberately introduced materials (e.g., wellbore equipment) whose surface is also prone to scale deposition, in a subterranean formation, although the removal of scale from other surfaces of the type disclosed herein is also contemplated. In an embodiment, the WSF comprising a chelating agent may be used for the removal of mineral scale deposits/accumulations or scale from a surface of the wellbore and/or subterranean formation. In some embodiments, the WSF comprising a chelating agent may be used for the removal of scale from the wellbore equipment (e.g., downhole equipment, surface equipment associated with the wellbore) surfaces that are in fluid communication with the wellbore and/or subterranean formation such that fluids (e.g., produced fluids) travelling to and/or from the wellbore and/or subterranean formation contact said surfaces. Nonlimiting examples of wellbore equipment that might accumulate scale on one or more surfaces include heating turbines, heat exchangers, safety valves, casings, production tubing, mandrels, pipes, separators, pumps, tubulars, vessels, completion equipment (e.g., screens, etc.), downhole tools and any other piece of equipment that might come in contact with a wellbore fluid (e.g. water), whether such fluid (e.g., water) is produced or part of a servicing fluid. In other embodiments, the WSF comprising a chelating agent may be used for the removal of scale from any surface that might come in contact with a produced natural resource (e.g., water, steam, hot water, oil, etc.).

In an embodiment, the WSF comprises a chelating agent. Without wishing to be limited by theory, a chelating agent or chelant is a chemical compound that forms soluble, complex molecules, i.e., "chelates," with certain metal ions, inactivating the ions so that they cannot normally react with other elements or ions to produce scale or precipitates. The process by which chelates form as a result of the interaction between chelating agents and metal ions, for example, is termed chelation. Further, without wishing to be limited by theory, chelation represents the formation or presence of two or more bonds (or other attractive interactions), which are generally termed coordinate bonds, between two or more separate binding sites, which are generally termed coordination sites or chelation sites, within the same ligand and a single central metal atom. A ligand with two or more coordination sites can be generally described as bidentate or didentate (for two coordination sites), tridentate (for three coordination sites), tetradentate (for four coordination sites), pentadentate (for five coordination sites) and so on, or polydentate or multidentate (for multiple coordination sites).

In an embodiment, the chelating agent comprises an amino multicarboxylic acid and/or an amino multicarboxylate. For purposes of the disclosure herein, the amino multicarboxylic acid can be referred to as a multicarboxylic acid, and the amino multicarboxylate can be referred to as a multicarboxylate. Without wishing to be limited by theory, a multicarboxylic acid has a $pK_a$ (acid dissociation logarithmic constant) value for each of its carboxylic acid functions; in the case of a multicarboxilic acid, all $pK_a$ values may be different from each other. Further, without wishing to be limited by theory, when a multicarboxylic acid has multiple $pK_a$ values, there are some pH values where some of the carboxylic acid groups will be protonated (i.e., —COOH), and some other carboxylic acid groups will be in the anionic carboxylate form (i.e., —COO$^-$). For example, if the multicarboxylic acid is a dicarboxylic acid and the two carboxylic acid groups have a $pKa_1$ of 2 and a $pKa_2$ of 5, when the dicarboxylic acid is in a solution that has a pH above the $pKa_2$ of 5, both carboxylic acid groups are in the anionic carboxylate form (i.e., —COO$^-$); when the dicarboxylic acid is in a solution that has a pH below the $pKa_1$ of 2, both carboxylic acid groups are in the protonated form (i.e., —COOH); and when the dicarboxylic acid is in a solution that has a pH between the $pKa_1$ of 2 and the a $pKa_2$ of 5, the carboxylic acid group with a $pKa_1$ of 2 will be in the anionic carboxylate form (i.e., —COO$^-$), and the carboxylic acid group with a $pKa_2$ of 5 will be in the protonated form (i.e., —COOH). In an embodiment, a carboxylic or multicarboxylic acid ligand chelates metal ions preferentially when the carboxylic or multicarboxylic acid ligand is in the anionic carboxylate form (i.e., —COO$^-$).

In an embodiment, the chelating agent comprises an amino multicarboxylic acid that (i) has $pK_a$ values greater than about 1, alternatively greater than about 1.8, or alternatively greater than about 2; and (ii) at least two carboxylic acid groups in the anionic carboxylate form (i.e., —COO$^-$) at pH values less than about 6, alternatively less than about 5, or alternatively less than about 3. For purposes of the disclosure herein, the chelation sites of the amino multicarboxylic acid include carboxyl and/or carboxylate groups, amino groups, ether groups, or combinations thereof.

Nonlimiting examples of multicarboxylic acids suitable for use as chelating agents in the present disclosure include methylglycine diacetic acid (MGDA); amino polyether multicarboxylic acids, N-tris[2-(1,2-dicarboxyethoxy)ethyl]amine (i.e., TCA6 characterized by Structure I), N-bis[2-(carboxymethoxy)ethyl]glycine (i.e., BCA3 characterized by Structure II), N-bis[2-(1,2-dicarboxyethoxy)ethyl]glycine (i.e., BCA5 characterized by Structure III), N-bis[2-(1,2-dicarboxyethoxy)ethyl]aspartic acid (i.e., BCA6 characterized by Structure IV), N-bis[2-(methyl-carboxymethoxy)ethyl]glycine (i.e., MBCA3 characterized by Structure V), N-bis[2-(1,2-dicarboxyethoxy)ethyl]methylglycine (i.e., MBCA5 characterized by Structure VI); β-alanine diacetic acid (β-ADA); ethylenediaminedisuccinic acid (EDDS); glutamic acid diacetic acid (GLDA); hydroxyethylenediaminetriacetic acid (HEDTA); diethylenediamine pentaacetic acid (DTPA); ethylenediamine tetraacetic acid (EDTA); nitrilotriacetic acid (NTA); iminodisuccinic acid (IDS or IDSA); 3-hydroxy-2,2'-iminodisuccinic acid (HIDS); or any combinations thereof.

Structure I

Structure II

Structure III

-continued

Structure IV

Structure V

Structure VI

In an embodiment, an amino polyether multicarboxylic acid suitable for use in the present disclosure as a chelating agent comprises an amino polyether compound characterized by Structure VII comprising one nitrogen atom and at least 5 chelation sites (e.g., pentadentate ligand):

Structure VII where the repeating methylene (—CH2-) unit may occur n times with the value of n ranging from about 1 to about 10, alternatively from about 1 to about 5, or alternatively from about 2 to about 4; A and B can each independently be hydrogen, a $C_1$-$C_4$ alkyl group, a carboxylic acid containing moiety, —$CH_2$—COOH, where the repeating methylene (—CH2-) unit may occur m times with the value of m ranging from about 1 to about 6, alternatively from about 1 to about 4, or alternatively from about 2 to about 3.

In an embodiment, a chelating agent suitable for use in the present disclosure may have a complexation constant for complexation reactions with metal ions typically involved in scale deposition or accumulation (e.g., $Ca^{2+}$, $Mg^{2+}$, $Cu^{2+}$, $Fe^{3+}$, $Fe^{2+}$, $Al^{3+}$, etc.) in the range of from about 1 to about 60, alternatively from about 10 to about 45, or alternatively from about 20 to about 35. Without wishing to be limited by theory, the complexation constant or stability constant of a chelating agent is the logarithm of an equilibrium constant which indicates the stability of the complexes formed by the chelating agent. The larger the value of the complexation constant, the more stable the complex formed by the chelating agent with a particular ion, the better the chelating agent for chelating such particular ion. Generally, the reported complexation constant is normally determined for the fully deprotonated form of the molecule (e.g., chelating agent molecule), which relates/corresponds to the ability of the molecule (e.g., chelating agent molecule) to chelate a cation (e.g., metal ion). The complexation constant is dependent upon a variety of parameters, out of which temperature influences the most the value of the complexation constant. Furthermore, the reported complexation constant is typically measured at room temperature. Moreover, the formation of a complex is known to occur in the pH range comprising the different $pK_a$ values associated with the different functional groups (e.g., carboxylate groups, amino groups, sulfonate moieties) of the molecule (e.g., chelating agent molecule), and such complex has a "conditional" (complexation/formation/stability) constant associated with it, which conditional constant is reported for a particular pH value. It is this latter characteristic (e.g., the presence of multiple functional groups within the same chelating agent molecule) that makes the use of chelating agents of the type disclosed herein relevant. For purposes of the disclosure herein, it is desirable for the chelating agent molecule to have a multitude of functional groups comprising protic moieties with $pK_a$ values in the acidic range (e.g., from about 1 to about 8), because this increases the stabilizing mechanisms (e.g., complexation) that can maintain cations (e.g., metal ions) in a soluble state even when cation (e.g., metal ion) concentration is above cation (e.g., metal ion) saturation concentration value for a particular solution.

In an embodiment, a chelating agent suitable for use in the present disclosure may be used in an environment that has preferably a pH value of less than about 8, alternatively from about 0 to about 8, alternatively from about 0 to about 7, alternatively from about 1 to about 7, alternatively from about 2 to about 7, or alternatively from about 2 to about 6.

In an embodiment, the chelating agent may be characterized as operable within a suitable temperature range. As will be appreciated by one of skill in the art viewing this disclosure, differing chelating agents may exhibit varying temperature ranges of operability. As such, in an embodiment, a chelating agent, or combination of chelating agents, may be selected for inclusion in the wellbore servicing fluid such that the chelating agent(s) exhibit a user and/or process-desired operable temperature range (e.g., an ambient downhole temperature or bottom hole temperature BHT) for a given wellbore). In an embodiment, the chelating agent may exhibit an operable temperature range of from about 65° F. to about 400° F., alternatively from about 72° F. to about 385° F., or alternatively from about 88° F. to about 365° F.

In an embodiment, the chelating agent may be included within the WSF in a suitable or effective amount (e.g., an amount effective to reduce/eliminate a desired amount of scale from a surface). The resultant concentration and/or amount of chelating agent that is necessary may be dependent upon a variety of factors such as the composition of the aqueous base fluid, the presence or absence of various additives; the composition of the scale; the thickness of the scale; the temperature of the operational environment (e.g., the wellbore); the composition of the formation, the pressure of the formation, the diameter of the hole, the particular chelating agent used, the expected contact time of the chelating agent with the formation; the desired amount of time necessary for removal of the scale; or combinations thereof. In an embodiment, a chelating agent of the type disclosed herein may be present within the WSF in an amount of from about 1 wt. % to about 50 wt. %, alternatively from about 5 wt. % to about 25 wt. %, or alternatively from about 10 wt. % to about 20 wt. %, based on the total weight of the WSF.

In an embodiment, the WSF comprises a pH adjusting compound. In an embodiment, the pH adjusting compound comprises an acid. In an embodiment, an acid may be used for decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of acids suitable for use in the present disclosure include inorganic acids, hydrochloric acid, sulphuric acid, sulfamic acid; acidic anhydrides; organic acids, formic acid, acetic acid, monochloroacetic acid, dichloroacetic acid, trichloroacetic acid, sulfinic acids, sulfonic acids, methanesulfonic acid, p-toluenesulfonic acid; and, if necessary, lactic acid, glycolic acid, oxalic acid, propionic acid, butyric acid; or combinations thereof. In an embodiment, the pH adjusting compound comprises hydrochloric acid.

In an embodiment, the WSF excludes hydrofluoric acid. In an embodiment, the WSF does not contain a material amount of hydrofluoric acid. In an embodiment, the WSF comprises hydrofluoric acid in an amount of less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the WSF.

In an embodiment, acids may be used for adjusting the pH of the WSF such that predetermined carboxylic acid groups of the chelating agent may be in the anionic carboxylate form (i.e., —COO$^-$), while other carboxylic acid groups of the chelating agent may be in the protonated form (i.e., —COOH), as previously described herein. In an embodiment, the acid may be included within the WSF in any suitable amount necessary to adjust the pH of the WSF to a particular pH value (e.g., a target pH), such as for example a pH value of about 1, about 2, about 3, about 4, about 5, about 6, etc.

In an embodiment, the WSF comprises an aqueous base fluid. Aqueous base fluids that may be used in the WSF include any aqueous fluid suitable for use in subterranean applications, provided that the aqueous base fluid is compatible with the chelating agent, and/or pH adjusting compound used in the WSF. For example, the WSF may comprise water or a brine. In an embodiment, the base fluid comprises an aqueous brine. In such an embodiment, the aqueous brine generally comprises water and an inorganic monovalent salt. The aqueous brine may be naturally occurring or artificially created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an embodiment, the salt or salts in the water may be present within the base fluid in an amount sufficient to yield a saturated brine. In an embodiment, the aqueous fluid comprises an about 1 M (molar) equivalent brine, when the WSF is intended for use in a formation comprising sandstone comprising swelling clays (e.g., smectite), to avoid damaging such formation. In an embodiment, the aqueous fluid comprises a CLA-WEB agent aqueous solution, wherein the CLA-WEB agent is present in an effective concentration (e.g., a concentration of up to about 5% by weight). CLA-WEB agent is a clay damage control additive commercially available from Halliburton Energy Services, Inc., Houston, Tex.

Nonlimiting examples of aqueous brines suitable for use in the present disclosure include chloride-based, bromide-based, or formate-based brines containing monovalent cations. In an embodiment, the brine comprises monovalent cations. Additional examples of suitable brines include, but are not limited to: NaCl, KCl, NaBr, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine. The brine may be present in an amount of from about 1 wt. % to about 20 wt. %, alternatively from about 2 wt. % to about 12 wt. %, or alternatively from about 2.5 wt. % to about 7 wt. %, based on the total weight of the WSF. Alternatively, the aqueous base fluid may comprise the balance of the WSF after considering the amount of the other components used.

In an embodiment, the WSF may optionally comprise one or more additives or additional components, as deemed appropriate for improving the properties of the fluid. Such additives may vary depending on the intended use of the fluid in the wellbore. Examples of such additives include, but are not limited to corrosion inhibitors, silica scale polymerization inhibitors, surfactants, breaking agents, emulsifiers, relative permeability modifiers, organic/inorganic viscosifiers, gelling agents, crosslinkers, weighting agents, carbon fibers, suspending agents, clay control agents, dispersants, flocculants, acids, foaming agents, salts, scale inhibitors, scavengers, gas scavengers, antifoam agents, and the like, or combinations thereof. These additives may be introduced singularly or in combination using any suitable methodology and in amounts effective to produce the desired improvements in fluid properties. As will be appreciated by one of skill in the art with the help of this disclosure, any of the components and/or additives used in the WSF have to be compatible with the chelating agent used in the WSF composition.

In an embodiment, the WSF comprises a corrosion inhibitor. Without wishing to be limited by theory, a corrosion inhibitor is generally a chemical compound that may function to decrease (e.g., reduce, slow down, or lessen) the corrosion rate of a material, such as a metal or an alloy, typically by forming a coating, often a passivation layer, which prevents access of the corrosive substance to the metal or alloy.

In an embodiment, the corrosion inhibitor comprises a quaternary ammonium compound; a bis-quaternary ammonium compound (BQA); unsaturated carbonyl compounds, 1-phenyl-1-ene-3-butanone, cinnamaldehyde; unsaturated ether compounds, 1-phenyl-3-methoxy-1-propene; unsaturated alcohols, acetylenic alcohols, methyl butynol, methyl pentynol, hexynol, ethyl octynol, propargyl alcohol, benzylbutynol, ethynylcyclohexanol; Mannich condensation products (such as those formed by reacting an aldehyde, a carbonyl containing compound and a nitrogen containing compound); condensation products formed by reacting an aldehyde in the presence of an amide; polysaccharides, inulin, tannins, tannic acid, catechin, epicatechin, epigallocatechin, epicatechingallate; formamide, formic acid, formates; other sources of carbonyl; iodides; fluorinated surfactants; quaternary derivatives of heterocyclic nitrogen bases; quaternary derivatives of halomethylated aromatic compounds; terpenes; aromatic hydrocarbons; coffee, tobacco, gelatin; derivatives thereof, and the like, or combinations thereof. Corrosion inhibitors suitable for use in the present disclosure are described in more detail in U.S. Pat. Nos. 3,077,454; 5,697,443; 7,621,334; U.S. Publication Nos. 2012/0238479 A1, 2012/0142563 A1, and 2012/0145401 A1, each of which is incorporated by reference herein in its entirety.

In an embodiment, the corrosion inhibitor comprises a quaternary ammonium compound of the general formula $(R)_4N^+X^-$, wherein the R groups represent the same or different long chain alkyl, cycloalkyl, aryl or heterocyclic groups and X represents an anion, such as for example a halide. In an embodiment, the corrosion inhibitor comprises an N-alkyl, N-cyclohexyl or N-aryl pyridinium or quinolinium compound. Nonlimiting examples of quaternary ammonium compounds suitable for use in the present disclosure include N-alkyl, N-cycloalkyl and N-alkylaryl pyridinium halides, such as N-cyclohexylpyridinium bromide, N-octylpyridinium bromide, N-nonylpyridinium bromide, N-decylpyridinium bromide, N-dodecylpyridinium bromide, N,N-didodecyldipyridinium dibromide, N-tetradecylpyridinium bromide, N-laurylpyridinium chloride, N-dodecylbenzylpyridinium chloride, N-dodecylquinolinium bromide, N-(1-methylnapthyl)quinolinium chloride, N-benzyl)quinolinium chloride, monochloromethylated and bischloromethylated pyridinium halides; ethoxylated and propoxylated quaternary ammonium compounds, sulfated ethoxylates of alkyl phenols and primary and secondary fatty alcohols, didodecyldimethylammonium chloride, hexadecylethyldimethylammonium chloride, 2-hydroxy-3-(2-undecylamidoethylamino)-propane-1-triethylammonium hydroxide, 2-hydroxy-3-(2-heptadecylamidoethylamino)-propane-1-triethylammonium hydroxide, 2-hydroxy-3-(2-heptadecylamidoethylamino)-propane-1-triethylammonium hydroxide, and the like, or combinations thereof.

In an embodiment, the corrosion inhibitor comprises a BQA of the general formula $Y^-N^+(R_1)_4-Z-(R_1)_4N^+Y^-$, wherein the Z and $R_1$ groups represent the same or different long chain alkyl, cycloalkyl, aryl or heterocyclic groups and Y represents the same or different anion, such as for example a halide. Nonlimiting examples of BQAs suitable for use in the present disclosure include 1,10-bis(2-methyl-4-aminoquinolinium chloride)-decane; 1,6-bis[1-methyl-3-(2,2,6-trimethyl cyclohexyl)-propyldimethyl ammonium chloride] hexane; or combinations thereof.

Nonlimiting examples of commercially available corrosion inhibitors suitable for use in the present disclosure include MSA-II corrosion inhibitor, MSA-III corrosion inhibitor, HAI-25E+ environmentally friendly low temp corrosion inhibitor, HAI-404 acid corrosion inhibitor, HAI-50 inhibitor, HAI-60 corrosion inhibitor, HAI-62 acid corrosion inhibitor, HAI-65 corrosion inhibitor, HAI-72E+ corrosion inhibitor, HAI-75 high temperature acid inhibitor, HAI-81M acid corrosion inhibitor, HAI-85 acid corrosion inhibitor, HAI-85M acid corrosion inhibitor, HAI-202 environmental corrosion inhibitor, HAI-OS corrosion inhibitor, HAI-GE corrosion inhibitor, FDP-S692-03 corrosion inhibitor for organic acids, FDP-S656AM-02 environmental corrosion inhibitor system and FDP-S656BW-02 environmental corrosion inhibitor system, all of which are available from Halliburton Energy Services, Inc.

In an embodiment, a corrosion inhibitor intensifier may be used with a corrosion inhibitor. A corrosion inhibitor intensifier may function to enhance the activity of the corrosion inhibitor, e.g., decrease further the corrosion rate. Nonlimiting examples of commercially available corrosion inhibitor intensifiers suitable for use in the present disclosure include HII-500 corrosion inhibitor intensifier, HII-500M corrosion inhibitor intensifier, HII-124 acid inhibitor intensifier, HII-124B acid inhibitor intensifier, HII-124C inhibitor intensifier, and HII-124F corrosion inhibitor intensifier, all of which are available from Halliburton Energy Services, Inc.

In an embodiment, the corrosion inhibitor may be included within the WSF in a suitable amount. As will be appreciated by one of skill in the art, and with the help of this disclosure, the amount of corrosion inhibitor necessary for a particular application is highly dependent on a variety of parameters, such as for example temperature and type of metallurgy (e.g., the composition of the equipment that is intended to be protected by such corrosion inhibitor). In an embodiment a corrosion inhibitor of the type disclosed herein may be present within the WSF in an amount of from about 0.05 wt. % to about 1 wt. %, alternatively from about 0.1 wt. % to about 0.8 wt. %, or alternatively from about 0.0001 wt. % to about 0.01 wt. %, based on the total weight of the WSF.

In an embodiment, the WSF comprises a silica scale polymerization inhibitor. The silica scale polymerization inhibitor may function to suppress silica scale build-up by increasing the solubility of silica in solution, inhibiting silica polymer chain propagation, and/or decreasing the size or quantity of any silica scale created in a solution. Nonlimiting examples of silica scale polymerization inhibitor suitable for use in the present disclosure include polyaminoamide dendrimers, polyethyleneimine, carboxymethylinulin, polyacrylates, polyallylamines, poly(diallyldiamethylammonium chloride), polyacrylamides, copolymers thereof, or combinations thereof. Silica scale polymerization inhibitors are described in more detail in U.S. Publication No. 2012/0172263 A1, which is incorporated by reference herein in its entirety.

In an embodiment, the WSF comprises a surfactant. The surfactant may function to improve the compatibility of the WSF with other fluids (e.g., formation fluids) that may be present in the subterranean formation and/or to enhance contact of the WSF with one or more scaled surfaces. In an embodiment, a surfactant may be used to enhance the reactivity of the WSF by, for example, breaking any emulsions present from the drilling fluid system or improving the interfacial interactions between the scale deposit and the WSF thereby allowing the WSF to contact the scale deposit more easily. Nonlimiting examples of surfactants suitable for use in the WSF include ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, trimethylcocoammonium chloride, or combinations thereof.

Commercial examples of surfactants that may be suitable for use in the present disclosure include without limitation CFS-485 casing cleaner, LOSURF-300M surfactant, LOSURF-357 surfactant, LOSURF-360 surfactant, LOSURF-400 surfactant, LOSURF-2000S surfactant, LOSURF-2000M surfactant, LOSURF-259 nonemulsifier, and NEA-96M surfactant. CFS-485 casing cleaner is a blend of surfactants and alcohols; LOSURF-300M surfactant is a nonionic surfactant; LOSURF-357 surfactant is a nonionic liquid surfactant; LOSURF-360 surfactant is a nonionic surfactant; LOSURF-400 surfactant is a nonemulsifier; LOSURF-2000S surfactant is a blend of an anionic nonemulsifier and an anionic hydrotrope; LOSURF-2000M surfactant is a solid surfactant; LOSURF-259 nonemulsifier is a nonionic, nonemulsfier blend; and NEA-96M surfactant is a general surfactant and nonemulsifier; all of which are available from Halliburton Energy Services, Inc.

Surfactants suitable for use in the present disclosure are described in more detail in U.S. Pat. No. 7,992,656, which is incorporated by reference herein in its entirety. In an embodiment, the surfactants may be present in the WSF in an amount sufficient to prevent incompatibility with formation fluids or wellbore fluids. In an embodiment, where liquid surfactants are used, the surfactants may be present in an amount of from about 0.1 wt. % to about 5 wt. %, alternatively from about 0.5 wt. % to about 4 wt. %, or alternatively from about 1 wt. % to about 3 wt. %, based on the total weight of the WSF. In an embodiment, where powdered surfactants are used, the surfactants may be present in an amount in the range of from about 0.01 wt. % to about 1 wt. %, alternatively from about 0.05 wt. % to about 0.5 wt. %, or alternatively from about 0.1 wt. % to about 0.3 wt. %, based on the total weight of the WSF.

In some embodiments, it may be beneficial to add a surfactant to the WSF as it is being pumped downhole, inter allia, to help reduce the possibility of forming emulsions with natural resources (e.g., oil) produced by the wellbore. In some embodiments, microemulsion additives optionally may be included in the WSF. Nonlimiting examples of emulsion-minimizing surfactants and microemulsion additives suitable for use in the present disclosure include PEN-88M surfactant, PEN-88HT surfactant, SSO-21E surfactant, SSO-21MW agent, and GASPERM 1000 service. PEN-88M surfactant is a nonionic penetrating surfactant; PEN-88HT surfactant is a high-temperature surfactant; SSO-21E surfactant is a foaming surfactant; SSO-21MW agent is a foaming surfactant and GASPERM 1000 service is a microemulsion; all of which are commercially available from Halliburton Energy Services, Inc.

As will be apparent to one of skill in the art, with the help of this disclosure, other suitable additives/components may be used in the WSF, and each additive/component of the WSF may perform more than one function (e.g., BQAs may be corrosion inhibitors as well as clay control agents).

In an embodiment, the WSF comprises a chelating agent, a pH adjusting compound, and a brine. For example, the WSF may comprise 20 wt. % MGDA, and the balance comprises a KCl brine with a concentration of 2% by weight, based on the total weight of the WSF. The pH adjusting compound comprises hydrochloric acid in an amount suitable for adjusting the pH of the WSF to a value of about 2.5.

In another embodiment, the WSF comprises a chelating agent, a pH adjusting compound, and a brine. For example, the WSF may comprise 20 wt. % MGDA, and the balance comprises a CLA-WEB agent aqueous solution with a concentration of 5% by weight, based on the total weight of the WSF. The pH adjusting compound comprises hydrochloric acid in an amount suitable for adjusting the pH of the WSF to a value of about 2.5.

In yet another embodiment, the WSF comprises a chelating agent, a pH adjusting compound, a corrosion inhibitor, and a brine. For example, the WSF may comprise 16 wt. % MGDA, 0.1 wt. % FDP-S692-03 corrosion inhibitor, and the balance comprises a KCl brine with a concentration of 2% by weight, based on the total weight of the WSF. The pH adjusting compound comprises hydrochloric acid in an amount suitable for adjusting the pH of the WSF to a value of about 2.5.

In still yet another embodiment, the WSF comprises a chelating agent, a pH adjusting compound, a corrosion inhibitor, and a brine. For example, the WSF may comprise 16 wt. % MGDA, 0.1 wt. % FDP-S692-03 corrosion inhibitor, and the balance comprises a CLA-WEB agent aqueous solution with a concentration of 5% by weight, based on the total weight of the WSF. The pH adjusting compound comprises hydrochloric acid in an amount suitable for adjusting the pH of the WSF to a value of about 2.5.

In still yet another embodiment, the WSF comprises a chelating agent, a pH adjusting compound, a corrosion inhibitor, and a brine. For example, the WSF may comprise 16 wt. % MGDA, 0.5 wt. % MSA-III corrosion inhibitor, and the balance comprises a CLA-WEB agent aqueous solution with a concentration of 5% by weight, based on the total weight of the WSF. The pH adjusting compound comprises hydrochloric acid in an amount suitable for adjusting the pH of the WSF to a value of about 2.5.

In an embodiment, the WSF composition comprising a chelating agent may be prepared using any suitable method or process. The components of the WSF (e.g., chelating agent, pH adjusting compound, aqueous base fluid, corrosion inhibitor, etc.) may be combined and mixed in by using any mixing device compatible with the composition, e.g., a mixer, a blender, etc.

In an embodiment, a method of servicing a wellbore comprises drilling a wellbore in a subterranean formation and introducing to the wellbore and/or surrounding formation a wellbore servicing fluid (WSF). As used herein, a "servicing fluid" refers to a fluid used to drill, complete, work over, fracture, repair, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water. Examples of wellbore servicing fluids include, but are not limited to, drilling fluids or muds, spacer fluids, lost circulation fluids, washing fluids, sweeping fluids, fracturing fluids, acidizing fluids, completion fluids, filter cake removal fluids, or cement slurries.

In an embodiment, the components of the WSF are combined at the well site; alternatively, the components of the WSF are combined off-site and are transported to and used at the well site. The resulting WSF may be pumped downhole where it may function as intended (e.g., remove at least a portion of a scale deposits on a surface in fluid communication with the wellbore and/or subterranean formation).

As it will be appreciated by one of ordinary skill in the art and with the help of this disclosure, a WSF comprising a chelating agent may be used for the removal of scale in any suitable stage of a wellbore's life, such as for example, during a drilling operation, completion operation, production stage, etc. In an embodiment, the WSF comprising a chelating agent may be used for removing scale deposits from any surfaces in fluid communication with the wellbore, as previously described herein.

In an embodiment, the chelating agents of the WSF may be used for the removal of scale and/or dissolved metal ions. Nonlimiting examples of metal ions that may be found in the wellbore environment and may contribute to the formation of scale deposits include $Ca^{2+}$, $Mg^{2+}$, $Ba^{2+}$, $Sr^{2+}$, $Fe^{2+}$, $Fe^{3+}$, $Cu^{2+}$, $Mn^{2+}$, $Ag^+$, $Ni^{2+}$, $Sb^{1+}$, $Al^{3+}$, $Cr^{3+}$, $As^{3+}$, $As^{5+}$, and the like. The different metal ions may be naturally present in the wellbore environment, and/or may be artificially generated by a wellbore servicing operation, such as for example swabbing, rimming or scraping with oilfield tools necessary to mechanically access the well, and in such case the oilfield tools can erode the surface of wellbore equipment (e.g., piping, tubulars, etc.), thereby enriching the wellbore environment with various metals (e.g., Fe, Ni, etc.). Deep subsurface water (e.g., formation water) may become enriched with ions by solubilizing the encountered sedimentary minerals. The water in carbonate and calcite-cemented sandstone reservoirs usually contains an abundance of divalent calcium ($Ca^{2+}$) and divalent magnesium ($Mg^{2+}$) cations. Sandstone formation fluids often contain divalent barium ($Ba^{2+}$) and divalent strontium ($Sr^{2+}$) cations. The precise metal ion composition of formation fluids (e.g., formation water) has a complex dependence on mineral diagenesis. Some of the common scales in wellbore environments comprise sulfates, calcium sulfate ($CaSO_4$), barium sulfate ($BaSO_4$), strontium sulfate ($SrSO_4$), iron sulfate ($FeSO_4$); carbonates, calcium carbonate ($CaCO_3$), calcite, aragonite, iron carbonate ($FeCO_3$); silica ($SiO_2$), amorphous silica ($SiO_2(OH)_x$), crystalline silica, silicates; sulfides, pyrite; transitional metal precipitates; iron precipitates, iron hydroxides, iron oxides, magnetite ($Fe_3O_4$), iron salts; copper precipitates, copper hydroxides, hydrated copper chlorides ($CuCl(OH)_x$), copper oxides ($Cu_yO$), copper salts; silver salts; and the like; or combinations thereof. In an embodiment, the scale comprises less than about 80 wt. % silica, less than about 50 wt. % silica, alternatively from about 10 wt. % to about 50 wt. % silica, alternatively from about 20 wt. % to about 50 wt. % silica, or alternatively from about 30 wt. % to about 50 wt. % silica, based on the total weight of the scale deposit.

In an embodiment, a WSF comprising a chelating agent of the type disclosed herein may be utilized for scale removal in wellbores having BHTs in the range of from about 200° F. to about 400° F., alternatively from about 230° F. to about 380° F., or alternatively from about 250° F. to about 380° F. In some embodiments, a WSF comprising a chelating agent of the type disclosed herein may be utilized for scale removal in high temperature/high pressure wellbores having (i) a BHT greater than about 300° F., alternatively greater than about 325° F., or alternatively greater than about 325° F.; and (ii) a borehole pressure greater than about 10,000 psi, alternatively greater than about 12,500 psi, or alternatively greater than about 15,000 psi. In other embodiments, a WSF comprising a chelating agent of the type disclosed herein may be utilized for scale removal in extreme high temperature/high pressure wellbores having (i) a BHT greater than about 350° F., alternatively greater than about 375° F., or alternatively greater than about 400° F.; and (ii) a borehole pressure greater than about 15,000 psi, alternatively greater than about 17,500 psi, or alternatively greater than about 20,000 psi.

In an embodiment, the WSF comprising a chelating agent may be utilized in a drilling and completion operation. In such an embodiment, an aqueous drilling mud may be circulated through the wellbore while the wellbore is drilled in a conventional manner. Debris such as drilling mud and mineral deposits (e.g., scale) left in the wellbore can have an adverse effect on several aspects of a well's completion and production stages, from inhibiting the performance of downhole tools to inducing formation damage and plugging production tubing. As will be appreciated by one of skill in the art viewing this disclosure, as the aqueous drilling fluid is circulated through the wellbore, scale may be deposited on any of the surfaces that the aqueous drilling fluid comes in contact with (e.g., tubing, pipes, valves, formation surface, etc.). Water, such as the base fluid of the drilling fluid, is a good solvent for many materials and can carry large amounts of scaling minerals. All natural waters contain dissolved components acquired through contact with mineral phases in the natural environment, giving rise to complex fluids, rich in ions, and consequently have a high propensity for scale formation. Accordingly, concurrent with and/or subsequent to drilling operations where scale is formed on a surface in fluid communication with the wellbore and/or subterranean formation, a WSF comprising a chelating agent may be placed downhole and contacted with the scale to remove all or a portion thereof. In an alternative embodiment, concurrent with and/or subsequent to drilling operations where scale is formed and/or likely to be formed on a downhole surface, a WSF comprising a chelating agent (or components thereof) may be combined with an aqueous based drilling fluid to prevent/reduce the formation of scale and/or remove all or a portion of existing scale.

In an additional embodiment, the WSF comprising a chelating agent may be utilized in conjunction with a formation evaluation operation such as electronically logging the wellbore. For example, in an embodiment, the wellbore may be evaluated via electronic logging techniques following sufficient contact between the scale and the WSF comprising a chelating agent to remove all or a portion of the scale, as disclosed herein. In such an embodiment, a method of evaluating a formation utilizing a WSF comprising a chelating agent of the type disclosed herein may generally comprise circulating a drilling fluid during a drilling operation (wherein scale is formed during the drilling) and, upon the cessation of drilling operations and/or upon reaching a desired depth, removing the scale deposits from a downhole surface (e.g., a wellbore surface, formation surface, equipment surface, etc.) utilizing a WSF comprising a chelating agent, as disclosed herein. Upon sufficient removal of the scale deposits, logging tools may be run into the wellbore to a sufficient depth to characterize a desired portion of the subterranean formation penetrated by the wellbore.

In an embodiment, when desired (for example, upon the cessation of drilling operations and/or upon reaching a desired depth), the wellbore or a portion thereof may be prepared for completion. In completing the wellbore, it may be desirable to remove all or a substantial portion of the scale from any surfaces where scale might have been deposited, from equipment surface to formation surface.

In an embodiment, the method of using a WSF comprising a chelating agent of the type disclosed herein may comprise completing the wellbore. In such an embodiment, the wellbore, or a portion thereof, may be completed by providing a casing string within the wellbore and cementing or otherwise securing the casing string within the wellbore. In such an embodiment, the casing string may be positioned (e.g., lowered into) the wellbore to a desired depth prior to, concurrent with, or following provision of the WSF comprising a chelating agent and/or removal of the scale deposit.

When the scale has been sufficiently degraded and/or removed from the downhole surface (e.g., wellbore surface, equipment/casing surface, formation surface, etc.), the WSF comprising a chelating agent may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been positioned, the cementitious slurry may be allowed to set.

In an embodiment, the WSF comprising a chelating agent may be utilized during the production stage of a wellbore. When the wellbore reaches the production stage, whenever water is produced as the natural resource (e.g., steam, hot water, etc.) or along with the natural resource (e.g., oil), scale may deposit on any of the surfaces that the produced water comes in contact with (e.g., formation surface, production tubing, etc.). The presence of scale may slow down or completely stop production of the natural resource (e.g., oil, water, steam, etc.), so it may desirable to perform another operation of scale removal. Accordingly, a WSF comprising a chelating agent may be placed downhole in association with a production enhancement operation or service, where the WSF comprising a chelating agent is contacted with a downhole surface (e.g., formation surface, wellbore surface, equipment surface, etc.) in fluid communication with the wellbore and/or subterranean formation to remove all or a portion of scale therefrom and thereby increase the rate of production of resources from the well.

In an embodiment, the WSF comprising a chelating agent may be utilized for servicing a subterranean formation having a BHT in excess of 300° F. Without wishing to be limited by theory, such subterranean formation includes high temperature wells, steam assisted gravity drainage (SAGD) wells, steam injector wells, and/or geothermal wells. High temperature wells are based on a geothermal process which is engineered to generally release steam, heat or hot water (e.g., produced natural resource or geothermal fluid) to produce electricity by spinning turbine generators. SAGD wells are based on a recovery process for the production of heavy oils and bitumen resources, which process uses gravity as the driving force and a pair of horizontal wells for injection/production. The SAGD pair of horizontal wells are drilled at a short distance from each other, one above the other. Steam is injected into the upper SAGD well and hot fluids are produced from the lower SAGD well. This progressively creates a steam chamber, which develops by condensing steam at the chamber boundary and gives latent energy to the surrounding reservoir. Heated oil and water are drained by gravity along the chamber walls toward the SAGD production well. SAGD wells are described in more detail in Energy & Fuels, 2004, volume 18, p. 1656-1664, which is incorporated by reference herein in its entirety. Steam injector wells are generally a part of an enhanced oil recovery method for the extraction of heavy crude oil. Steam injector wells are based on the thermal stimulation of oil reservoirs, with the two main types of thermal stimulation being Cyclic Steam Stimulation and Steam Flooding. High temperature or geothermal wells usually have downhole equipment (e.g., pipes, tubulars, downhole tools, etc.) and surface equipment (e.g., heating turbines, heat exchangers) associated with the wellbore, which equipment comprises surfaces in fluid communication with a wellbore and/or subterranean formation, and such surfaces are prone to scale formation. Silica and other salts that may form scales of the type previously described herein may cause severe scaling problems when they are dissolved in geothermal fluids (e.g., steam and/or hot water produced by a geothermal well). Without wishing to be limited by theory, after the extraction of a high temperature or geothermal fluid (e.g., steam, hot water, etc.) from the well and upon cooling of such geothermal fluid (e.g., steam, hot water, etc.), the likelihood of precipitation of any dissolved solids present in the geothermal fluid (e.g., steam, hot water, etc.) increases, due to a decrease in solubility with decreasing the temperature, and this may lead to the formation of scale. The formation of scale in high temperature or geothermal wells may lead to a variety of problems, ranging from decreased efficiency of heat exchangers to complete blockage of pipes and stopped production, so it may be desirable to perform an operation of scale removal. Accordingly, a WSF comprising a chelating agent may be placed downhole (e.g., run/circulated through the production tubing); it may be run/circulated through the surface equipment (e.g., heating turbines, heat exchangers) associated with the wellbore; or in any other suitable way contacted with a scale present on a surface in fluid communication with a wellbore and/or subterranean formation, to remove all or a portion of scale therefrom and thereby increase the rate of production of resources from the well.

In an embodiment, removing the scale may comprise contacting a WSF comprising a chelating agent with the scale present on a surfaces in fluid communication with a wellbore and/or subterranean formation. In such an embodiment, when a sufficient quantity of the WSF comprising a chelating agent has been placed in contact with the scale, the WSF may be allowed to remain in contact with the scale for a sufficient period of time such that the chelating agent will remove all or a substantial portion of the scale from any surfaces where scale might have been deposited. For example, in such an embodiment the WSF comprising a chelating agent may be allowed to remain in contact with the scale for a soak-period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours, or alternatively at least about 100 hours. In an embodiment, during such a "soak period," the fluids within the wellbore and/or associated wellbore equipment may remain in a substantially static state, for example, as opposed to a dynamic state in which circulation may be present. In an embodiment, the wellbore may be shut-in while the WSF remains in contact with the scale deposits.

In an embodiment, the WSF comprising a chelating agent and methods of using the same disclosed herein may be advantageously employed as a servicing fluid in the performance of one or more wellbore servicing operations. For example, when utilizing a WSF comprising a chelating agent, scale may be removed from wells that have a fairly high BHT (e.g., greater than 300° F.) without the need to cool down the well. In an embodiment, the WSF comprising a chelating agent may be advantageously used for the removal of scale formed in a high temperature or geothermal well environment (e.g., silica scale or high temperature scale) without the need to cool down the well. Such scale is conventionally removed with a mixture of hydrochloric acid and hydrofluoric acid, where the content of hydrofluoric acid is fairly high, e.g., around 7% by weight. Such concentrated HCl/HF mixtures are hazardous; cannot be employed in hot environments (e.g., a geothermal well) without cooling the well down; pose a high risk of corrosion to any wellbore associated equipment they may come in contact with; may damage the formation; require high amounts of corrosion inhibitors and/or corrosion inhibitor intensifiers, which may have potentially adverse toxicological and/or environmental effects; and require neutralization upon completion of the scale removal operation. In an embodiment, the WSF comprising a chelating agent may be advantageously used for scale removal in a deep offshore wellbore. In an embodiment, the chelating agent may be advantageously used in a filter cake removal fluid.

In an embodiment, when a WSF comprising a chelating agent is used for downhole scale removal, after the scale removal process, the pH of the fluid that is recovered and/or flowed back to the surface may not be as low (i.e., may be less acidic) due to a variety of factors, and may advantageously not require neutralizing when recovered and/or flowed back to the surface, as opposed to the case when a servicing fluid comprising an inorganic acid (e.g., HCl, HF, etc.) instead of the WSF comprising a chelating agent for scale removal was contacted with a surface in fluid communication with a wellbore and/or subterranean formation. For example, a WSF comprising a chelating agent that is contacted with a surface in fluid communication with a wellbore and/or subterranean formation for removing the scale deposits may have a pH no lower than about 1 to about 2 and may not require neutralizing when recovered and/or flowed back to the surface, as opposed to conventional acid treatments that may be used for scale removal, in which case the pH of the fluid may be as low as about 0 to about 1 and may require neutralizing when recovered and/or flowed back to the surface. In an embodiment, utilizing a WSF comprising a chelating agent may advantageously lead to lower corrosion rates of the wellbore equipment (e.g., the equipment which was subjected to a scale removal operation). In an embodiment, the WSF comprising a chelating agent may be advantageously used in the absence of a corrosion inhibitor.

In an embodiment, the usage of a WSF comprising a chelating agent allows for improved scale removal. The metal ions from the scale form a complex with the chelating agent (e.g., metal ion chelates), and once the scale is removed off the surface of interest, the metal ions may advantageously remain in a chelated soluble form (e.g., metal ion chelates), thus preventing the possibility that such metal ions may re-precipitate and re-form the scale, which is often a problem when scale deposits are removed by an inorganic acidic solution, for example. The metal ions may remain in a chelated soluble form even when the pH of the environment surrounding the chelated metal ions changes, e.g., when the pH shifts from acidic to basic. This may prove especially advantageous in an embodiment where the chelated metal ions are not flowed back to the surface, but may remain in the wellbore environment.

In an embodiment, a WSF comprising a chelating agent may be advantageously used for chelating dissolved metal ions present in the wellbore environment, and as such may prevent scale formation, e.g., precipitation or deposition of such metal ions as salts or hydroxides on various surfaces in fluid communication with a wellbore and/or subterranean formation. In an embodiment, the usage of a WSF comprising a chelating agent may advantageously pose a lower risk of formation damage due to the ability of the chelating agent to effectively chelate $Fe^{3+}$ ions, for example.

In an embodiment, the WSF comprising a chelating agent may be advantageously used for scale removal operations in any suitable type of subterranean formations. Nonlimiting examples of formations suitable for this disclosure include sandstone, carbonate-containing formations, shale, or combinations thereof.

In an embodiment, a chelating agent of the WSF may advantageously have improved biodegradability, and a lower environmental impact, when compared to some conventional chelants. Without wishing to be limited by theory, the biodegradability of a chemical compound refers to the ability of such compound to undergo a process of chemical dissolution by microorganisms, such as bacteria, or other biological means. In an embodiment, a chelating agent suitable for use in the present disclosure provides at least 60% biodegradability in 28 days as determined in accordance with method OECD 301B, alternatively at least 65%, 70%, 75%, 80%, 90% or 100%. OECD 301B is a ready biodegradation test developed by the Organization for Economic Cooperation and Development (OECD) for assessing the biodegradability of materials (e.g., chemical compounds) in solution by respirometry based on $CO_2$ evolution. Ready biodegradation tests are aerobic screening tests designed so that positive results are unequivocal and lead to an assumption that the test substance will undergo rapid and complete degradation in the environment. Biodegradability of chemical compounds is described in more detail in Chem. Rev., 2009, vol. 107, p. 2207-2227, which is incorporated by reference herein in its entirety. In an embodiment, a WSF comprising a chelating agent of the type disclosed herein may advantageously display a toxicity level that is sufficiently low to meet one or more HSE guidelines. Additional advantages of using a WSF comprising a chelating agent of the type described herein may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The corrosion properties of a chelating agent comprising MGDA were investigated by corrosion testing. More specifically the corrosion of a metal alloy was monitored in the presence a chelating agent comprising MGDA. All corrosion testing was performed at 300° F. for time periods of either 6 h or 24 h. A 20.08 g piece of metal alloy with a known surface area was submerged in a solution containing either 16 wt. % or 20 wt. % of MGDA, with a pH ranging from 2.5 to 4.5. The pH of the MGDA solution was adjusted with HCl. The MGDA solution also contained a low amount of corrosion inhibitor, ranging from 0.1 wt. % to 0.5 wt. %. In some cases, CLA-WEB agent was also added to the solution in a concentration of 5% by weight. At the end of the testing time period (i.e., either 6 h or 24 h), the piece of metal alloy was weighed again, and the corrosion loss was calculated in $lb/ft^2$. A "pass" in corrosion testing requires a corrosion loss value of less than 0.05 $lb/ft^2$. The results of the corrosion testing are displayed in Table 1.

TABLE 1

| Temperature [° F.] | Chelating Agent | pH | Time [hrs] | Metal Alloy | Corrosion Inhibitor | Additives | Corrosion Loss [lb/ft$^2$] |
|---|---|---|---|---|---|---|---|
| 300 | 16 wt. % MGDA | 2.5 | 24 | 2205 (22Cr) | 0.1 wt. % FDP-S692-03 corrosion inhibitor | CLA-WEB agent | 0.0002 |
| 300 | 16 wt. % MGDA | 2.5 | 24 | 2205 (22Cr) | 0.3 wt. % FDP-S692-03 corrosion inhibitor | CLA-WEB agent | 0.0004 |
| 300 | 16 wt. % MGDA | 4.2 | 6 | N80 | 0.5 wt. % MSA-III corrosion inhibitor | none | 0.007 |
| 300 | 16 wt. % MGDA | 5.5 | 6 | N80 | 0.5 wt. % MSA-III corrosion inhibitor | none | 0.004 |
| 300 | 20 wt. % MGDA | 4.2 | 6 | N80 | 0.1 wt. % MSA-II corrosion inhibitor | none | 0.004 |
| 300 | 16 wt. % MGDA | 2.5 | 6 | N80 | 0.5 wt. % MSA-III corrosion- inhibitor | none | 0.011 |

All the samples tested for the results displayed in Table 1 have passed the corrosion testing in the presence of a MGDA solution, indicating that even at high temperatures, the chelating agent comprising MGDA does not pose a corrosion risk to the metal alloys tested. For the two samples that were tested in the presence of the CLA-WEB agent, there was virtually no corrosion, although the time frame for the corrosion testing in those cases was the longest (24 h). The corrosion loss with the chelating agent is minimum, something that cannot be attained with other scale dissolving fluids at low pH (1 to 2 pH units) without the use of corrosion inhibitors.

Example 2

The removal of scale by a chelating agent comprising MGDA was investigated. More specifically the removal of scale was observed in the presence and in the absence of HF. All scale removal testing was performed at 350° F. for time periods of 4 h. The pH of the MGDA solution (with or without HF) was adjusted with HCl to a value of either 2 or 2.5. A total of 1 g of a scale recovered from a subterranean well was tested in each case. The composition of the scale from the subterranean well was investigated by X-Ray Diffraction (XRD) analysis, and the results are displayed in Table 2. The XRD analysis was performed on an XRD instrument PANalytical D3058, and the analysis was carried out with full Rietveld refinement.

TABLE 2

| Mineral | |
|---|---|
| Hydrated copper chlorides | CuCl(OH)$_x$ |
| Copper oxides | Cu$_2$O |
| Hydrated Iron Oxides | FeO(OH) |
| Silver chloride | AgCl |
| Amorphous Silica | SiO$_2$(OH)$_x$ |

The scale was placed on a Hastelloy C high pressure reactor cell substrate, and was then contacted with a 0.6 M solution of MGDA in the absence or in the of presence of various amounts of HF, and at the end of the testing the sample was visually inspected and weighed, and the data is displayed in Table 3.

TABLE 3

| Sample No. | Chelating Agent | HF [wt. %] | pH | Visual Observation |
|---|---|---|---|---|
| 1 | 0.6M MGDA | 2.2 | 2.0 | Charred or decomposes |
| 2 | 0.6M MGDA | 1.5 | 2.0 | Charred or decomposes |
| 3 | 0.6M MGDA | 1.0 | 2.0 | Charred or decomposes |
| 4 | 0.6M MGDA | 2.2 | 2.5 | Charred or decomposes |
| 5 | 0.6M MGDA | 1.0 | 2.5 | Dissolution (24 wt. %) |
| 6 | 0.6M MGDA | 0.5 | 2.5 | Dissolution (26 wt. %) |
| 7 | 0.6M MGDA | 0 | 2.0 | Dissolution (46-52 wt. %) |

Figure 1A:
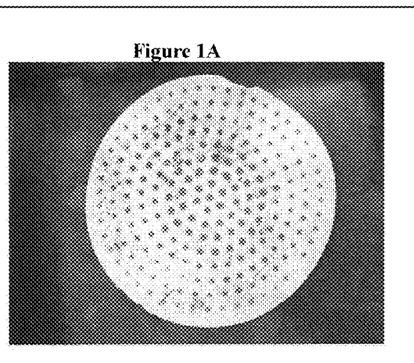
Figure 1B:
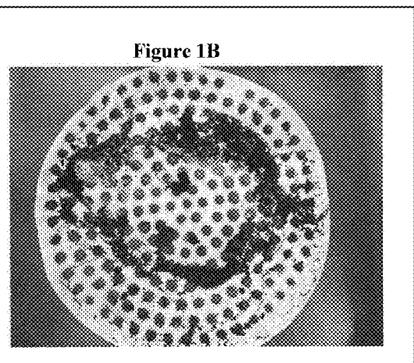

For samples 1, 2, 3, and 4 containing higher amounts of HF, the result was the undesirable burning or decomposition of the sample, as opposed to the desirable dissolution observed for samples 5 and 6 containing lower amounts of HF, or for sample 7 which contained no HF. The dissolution of sample 7 in the absence of HF (46-52 wt. %) was actually the highest observed for any of the samples tested, amounting to about half of the scale being dissolved in the time frame tested. The dissolution % was calculated based on the weight of the sample before and after treatment with the chelating agent solution. A picture of the sample 7 after the scale dissolution testing was completed is displayed in FIG. 1A, showing a dramatic difference when compared to sample 2, for example, which is shown after scale dissolution testing in FIG. 1B. The scale dissolution testing shows that the scale removal may be performed effectively with the chelating agents in the presence of low amounts of HF, and even in the absence of HF.

ADDITIONAL DISCLOSURE

A first embodiment, which is a method of servicing a wellbore in a subterranean formation comprising preparing a wellbore servicing fluid comprising an amino multicarboxylic acid chelating agent, a pH adjusting compound, and an aqueous base fluid, and contacting the wellbore servicing fluid with scale deposits on a surface in fluid communication with the wellbore and/or subterranean formation.

A second embodiment, which is the method of the first embodiment wherein the chelating agent comprises an amino multicarboxylic acid that (i) has pK$_a$ values greater than about 1; and (ii) at least two carboxylic acid groups in the anionic carboxylate form (i.e., —COO$^-$) at pH values less than about 6.

A third embodiment, which is the method of one of the first through second embodiments wherein the chelating agent comprises methylglycine diacetic acid (MGDA); amino polyether multicarboxylic acids, N-tris[2-(1,2-dicarboxyethoxy)ethyl]amine (i.e., TCA6 characterized by Structure I), N-bis[2-(carboxymethoxy)ethyl]glycine (i.e., BCA3 characterized by Structure II), N-bis[2-(1,2-dicarboxyethoxy)ethyl]glycine (i.e., BCA5 characterized by Structure III), N-bis[2-(1,2-dicarboxyethoxy)ethyl]aspartic acid (i.e., BCA6 characterized by Structure IV), N-bis[2-(methylcarboxymethoxy)ethyl]glycine (i.e., MBCA3 characterized by Structure V), N-bis[2-(1,2-dicarboxyethoxy)ethyl]methylglycine (i.e., MBCA5 characterized by Structure VI); β-alanine diacetic acid (β-ADA); ethylenediaminedisuccinic acid (EDDS); glutamic acid diacetic acid (GLDA); hydroxyethylenediaminetriacetic acid (HEDTA); diethylenediamine pentaacetic acid (DTPA); ethylenediamine tetraacetic acid (EDTA); nitrilotriacetic acid (NTA); iminodisuccinic acid (IDS or IDSA); 3-hydroxy-2,2'-iminodisuccinic acid (HIDS); or any combinations thereof.

Structure VII wherein A and B can each independently be hydrogen, a $C_1$-$C_4$ alkyl group, a carboxylic acid containing moiety, —$CH_2$—COOH, or combinations thereof.

A fifth embodiment, which is the method of one of the first through fourth embodiments wherein the chelating agent is present in the wellbore servicing fluid in an amount of from about 1 wt. % to about 50 wt. %, based on the total weight of the wellbore servicing fluid.

A sixth embodiment, which is the method of one of the first through fifth embodiments wherein the pH adjusting compound comprises inorganic acids, hydrochloric acid, sulphuric acid, sulfamic acid; acidic anhydrides; organic acids, formic acid, acetic acid, monochloroacetic acid, dichloroacetic acid, trichloroacetic acid, sulfinic acids, sulfonic acids, methanesulfonic acid, p-toluenesulfonic acid; lactic acid, glycolic acid, oxalic acid, propionic acid, butyric acid; or combinations thereof.

A seventh embodiment, which is the method of one of the first through sixth embodiments wherein the pH adjusting compound comprises hydrochloric acid.

An eighth embodiment, which is the method of one of the first through seventh embodiments wherein the aqueous base fluid comprises a brine.

A ninth embodiment, which is the method of the eighth embodiment wherein the brine is present in the wellbore servicing fluid in an amount of from about 1 wt. % to about 20 wt. %, based on the total weight of the wellbore servicing fluid.

A tenth embodiment, which is the method of one of the eighth through ninth embodiments wherein the brine comprises the balance of the wellbore servicing fluid after considering the amount of the other components used.

A eleventh embodiment, which is the method of one of the first through tenth embodiments wherein the composition comprises a chelating agent and the wellbore servicing fluid has a pH of from about 0 to about 8.

A twelfth embodiment, which is the method of one of the first through eleventh embodiments wherein the wellbore servicing fluid optionally comprises a corrosion inhibitor, a silica scale polymerization inhibitor, a surfactant, or combinations thereof.

A thirteenth embodiment, which is the method of one of the first through twelfth embodiments wherein the wellbore servicing fluid comprises an acidizing fluid.

A fourteenth embodiment, which is the method of one of the first through thirteenth embodiments wherein the wellbore has a bottom hole temperature in the range of from about 200° F. to about 400° F.

A fifteenth embodiment, which is the method of one of the first through fourteenth embodiments wherein the wellbore Structure I Structure II

Structure III

Structure IV

Structure V

Structure VI

A fourth embodiment, which is the method of the third embodiment wherein the amino polyether multicarboxylic acid comprises an amino polyether compound characterized by Structure VII comprising one nitrogen atom and at least 5 chelation sites:

comprises a high temperature well, a steam assisted gravity drainage well, a steam injector well, and/or a geothermal well.

A sixteenth embodiment, which is the method of one of the first through fifteenth embodiments wherein the surface in fluid communication with the wellbore and/or subterranean formation comprises a geological surface and/or a surface of equipment selected from the group consisting of heating turbines, heat exchangers, safety valves, casings, production tubing, mandrels, pipes, separators, pumps, tubulars, vessels, completion equipment, screens, downhole tools, and combinations thereof.

A seventeenth embodiment, which is the method of one of the first through sixteenth embodiments wherein the scale deposit comprises less than about 80 wt. % silica, based on the total weight of the scale deposit.

An eighteenth embodiment, which is the method of the seventeenth embodiment wherein the scale further comprises transition metal precipitates, iron precipitates, copper precipitates, and combinations thereof.

A nineteenth embodiment, which is a method of servicing a wellbore in a subterranean formation comprising preparing a wellbore servicing fluid comprising an amino multicarboxylic acid chelating agent, a pH adjusting compound, and an aqueous base fluid; wherein the chelating agent comprises methylglycine diacetic acid or glutamic acid diacetic acid, and the pH adjusting compound comprises hydrochloric acid, and contacting the wellbore servicing fluid with scale deposits on a surface in fluid communication with the wellbore and/or subterranean formation, wherein the scale deposits comprise less than about 80 wt. % silica, based on the total weight of the scale deposit.

A twentieth embodiment, which is the method of the nineteenth embodiment wherein the wellbore comprises a geothermal well with a bottom hole temperature in the range of from about 200° F. to about 400° F.

A twenty-first embodiment, which is a scale-removing wellbore servicing fluid comprising an amino multicarboxylic acid chelating agent acid that (i) has $pK_a$ values greater than about 1, and (ii) at least two carboxylic acid groups in the anionic carboxylate form (i.e., —COO⁻) at pH values less than about 6; a pH adjusting compound; and an aqueous base fluid.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
    preparing a wellbore servicing fluid comprising an amino multicarboxylic acid chelating agent, a pH adjusting compound, a silica scale polymerization inhibitor, and an aqueous base fluid, wherein the wellbore servicing fluid does not comprise hydrogen fluoride; and
    contacting scale deposits on a surface in fluid communication with the wellbore and/or subterranean formation with the wellbore servicing fluid,
    wherein the scale deposits comprise silica,
    wherein the silica scale polymerization inhibitor is selected from the group consisting of: a polyamino-amide dendrimer, a polyethyleneimine, a poly(diallyldiamethylammonium chloride), any copolymer thereof, and any combination thereof, and
    wherein the amino multicarboxylic acid chelating agent is selected from the group consisting of: an amino polyether multicarboxylic acid; N-tris[2-(1,2-dicarboxyethoxy)ethyl]amine characterized by Structure I (TCA); N-bis[2-(carboxy-methoxy)ethyl]glycine characterized by Structure II (BCA3); N-bis[2-(1,2-dicarboxy-ethoxy)ethyl]glycine characterized by Structure III (BCA5); N-bis[2-(1,2-dicarboxy-ethoxy)ethyl]aspartic acid—characterized by Structure IV (BCA6); N-bis[2-(methyl-carboxymethoxy)ethyl]glycine characterized by Structure V (MBCA3); N-bis[2-(1,2-dicarboxyethoxy)ethyl]methylglycine characterized by Structure VI (MBCA5); and any combination thereof:

Structure I

-continued

2. The method of claim 1 wherein the amino multicarboxylic acid chelating agent comprises an amino multicarboxylic acid that (i) has $pK_a$ values greater than about 1; and (ii) at least two carboxylic acid groups in the anionic carboxylate form (—COO⁻) at pH values less than about 6.

3. The method of claim 1 wherein the amino polyether multicarboxylic acid comprises an amino polyether compound characterized by Structure VII comprising one nitrogen atom and at least 5 chelation sites:

Structure VII wherein A and B can each independently be a carboxylic acid containing moiety, —CH₂—COOH, or combinations thereof, wherein n is a number from 1 to 10 and m is a number from 1 to 6.

4. The method of claim 1 wherein the amino multicarboxylic acid chelating agent is present in the wellbore servicing fluid in an amount of from about 1 wt. % to about 50 wt. %, based on the total weight of the wellbore servicing fluid.

5. The method of claim 1 wherein the pH adjusting compound comprises an acid selected from the group consisting of: hydrochloric acid, sulphuric acid, sulfamic acid; an acidic anhydride, formic acid, acetic acid, monochloroacetic acid, dichloroacetic acid, trichloroacetic acid, a sulfinic acid, a sulfonic acid, methanesulfonic acid, p-toluenesulfonic acid, lactic acid, glycolic acid, oxalic acid, propionic acid, butyric acid; and any combination thereof.

6. The method of claim 1 wherein the pH adjusting compound comprises hydrochloric acid.

7. The method of claim 1 wherein the aqueous base fluid comprises a brine.

8. The method of claim 7 wherein the brine is present in the wellbore servicing fluid in an amount of from about 1 wt. % to about 20 wt. %, based on the total weight of the wellbore servicing fluid.

9. The method of claim 7 wherein the brine comprises the balance of the wellbore servicing fluid after considering the amount of the other components used.

10. The method of claim 1 wherein the wellbore servicing fluid has a pH of from about 0 to about 8.

11. The method of claim 1 wherein the wellbore servicing fluid comprises at least one additive selected from the group consisting of: a corrosion inhibitor, a surfactant, and any combination thereof.

12. The method of claim 1 wherein the wellbore servicing fluid is an acidizing fluid.

13. The method of claim 1 wherein the wellbore has a bottom hole temperature in the range of from about 200° F. to about 400° F.

14. The method of claim 1 wherein the wellbore comprises a high temperature well, a steam assisted gravity drainage well, a steam injector well, and/or a geothermal well.

15. The method of claim 1 wherein the surface in fluid communication with the wellbore and/or subterranean formation comprises a geological surface and/or a surface of equipment selected from the group consisting of: a heating turbine, a heat exchanger, a safety valve, a casing, a production tubing, a mandrel, a pipe, a separator, a pump, a tubular, a vessel, a completion equipment, a screen, a downhole tool, and any combination thereof.

16. The method of claim 1 wherein the scale deposit comprises less than about 80 wt. % silica, based on the total weight of the scale deposit.

17. The method of claim 16 wherein the scale further comprises transition metal precipitates, iron precipitates, copper precipitates, and combinations thereof.

18. A method of servicing a wellbore in a subterranean formation comprising:
  preparing a wellbore servicing fluid comprising an amino multicarboxylic acid chelating agent, a pH adjusting compound comprising hydrochloric acid, a silica scale polymerization inhibitor, and an aqueous base fluid, wherein the wellbore servicing fluid does not comprise hydrogen fluoride; and
  contacting scale deposits on a surface in fluid communication with the wellbore and/or subterranean formation with the wellbore servicing fluid,
  wherein the scale deposits comprise silica in an amount of less than about 80 wt. %, based on the total weight of the scale deposit,
  wherein the silica scale polymerization inhibitor is selected from the group consisting of: a polyaminoamide dendrimer, a polyethyleneimine, a poly(diallyldiamethylammonium chloride), any copolymer thereof, and any combination thereof, and wherein the amino multicarboxylic acid chelating agent is selected from the group consisting of: an amino polyether multicarboxylic acid; N-tris[2-(1,2-dicarboxyethoxy)ethyl]amine characterized by Structure I (TCA); N-bis[2-(carboxy-methoxy)ethyl]glycine characterized by Structure II (BCA3); N-bis[2-(1,2-dicarboxy-ethoxy)ethyl]glycine characterized by Structure III (BCA5); N-bis[2-(1,2-dicarboxy-ethoxy)ethyl]aspartic acid—characterized by Structure IV (BCA6); N-bis[2-(methyl-carboxymethoxy) ethyl]glycine characterized by Structure V (MBCA3); N-bis[2-(1,2-dicarboxyethoxy)ethyl] methylglycine characterized by Structure VI (MBCA5); and any combination thereof:

19. The method of claim 18 wherein the wellbore comprises a geothermal well with a bottom hole temperature in the range of from about 200° F. to about 400° F.

* * * * *